(12) United States Patent
Seguchi

(10) Patent No.: US 11,050,330 B2
(45) Date of Patent: Jun. 29, 2021

(54) FIELD WINDING TYPE ROTARY MACHINE

(71) Applicant: DENSO CORPORATION, Kariya (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 16/296,962

(22) Filed: Mar. 8, 2019

(65) Prior Publication Data

US 2019/0207491 A1 Jul. 4, 2019

Related U.S. Application Data

(63) Continuation of application No. PCT/JP2017/031791, filed on Sep. 4, 2017.

(30) Foreign Application Priority Data

Sep. 8, 2016 (JP) .............................. JP2016-175786

(51) Int. Cl.
*H02K 19/26* (2006.01)
*H02K 19/12* (2006.01)
(Continued)

(52) U.S. Cl.
CPC ............... *H02K 19/12* (2013.01); *H02K 1/16* (2013.01); *H02K 1/26* (2013.01); *H02K 3/12* (2013.01);
(Continued)

(58) Field of Classification Search
CPC .. H02K 1/16; H02K 1/26; H02K 3/12; H02K 3/48; H02K 11/028; H02K 11/042; H02K 19/10; H02K 19/26; H02K 19/36; H02K 19/12; H02P 25/03; H02P 6/32; H02P 9/14; H02P 9/38; H02P 9/10; H02P 25/098; H02P 9/302; H02P 2101/45; H02P 2103/20
(Continued)

(56) References Cited

U.S. PATENT DOCUMENTS 4,246,532 A * 1/1981 Kubo ..................... H02K 19/16
322/89
7,358,698 B2 * 4/2008 Seguchi ................. H02K 19/28
318/700
(Continued)

FOREIGN PATENT DOCUMENTS

JP    2008-178211 A    7/2008
JP    2010-022185 A    1/2010
(Continued)

OTHER PUBLICATIONS

Nov. 28, 2017 International Search Report issued in International Patent Application No. PCT/JP2017/031791.

*Primary Examiner* — Burton S Mullins
(74) *Attorney, Agent, or Firm* — Oliff PLC

(57) ABSTRACT

A field winding type rotary machine includes a stator having a stator core and a stator coil wound on the stator core, a rotor having a rotor core and a rotor field coil wound on the rotor core, and a rectifier element connected between both ends of the rotor field coil. The field winding type rotary machine includes a capacitor having a first terminal connected to an anode terminal of the rectifier element and a second terminal connected to any point of the rotor field coil.

9 Claims, 7 Drawing Sheets

(51) Int. Cl.
*H02K 1/26* (2006.01)
*H02P 25/03* (2016.01)
*H02K 1/16* (2006.01)
*H02K 3/12* (2006.01)
*H02K 3/48* (2006.01)
*H02K 11/028* (2016.01)
*H02K 11/042* (2016.01)
*H02K 19/36* (2006.01)
*H02M 7/217* (2006.01)

(52) U.S. Cl.
CPC ............ *H02K 3/48* (2013.01); *H02K 11/028* (2013.01); *H02K 11/042* (2013.01); *H02K 19/26* (2013.01); *H02K 19/36* (2013.01); *H02M 7/217* (2013.01); *H02P 25/03* (2016.02)

(58) Field of Classification Search
USPC .......................... 310/263; 318/712, 716, 718
See application file for complete search history.

(56) References Cited

U.S. PATENT DOCUMENTS

| | | | | |
|---|---|---|---|---|
| 7,498,818 | B2* | 3/2009 | Benmouyal | G01R 31/343 |
| | | | | 324/509 |
| 7,880,424 | B2* | 2/2011 | Seguchi | H02P 9/009 |
| | | | | 318/712 |
| 8,847,455 | B2* | 9/2014 | Hiramoto | H02K 19/12 |
| | | | | 310/180 |
| 9,876,455 | B2* | 1/2018 | Seguchi | H02K 19/28 |
| 10,250,175 | B2* | 4/2019 | Seguchi | H02P 25/22 |
| 2012/0256510 | A1* | 10/2012 | Yamada | H02K 19/12 |
| | | | | 310/184 |
| 2015/0155753 | A1 | 6/2015 | Kubo et al. | |

FOREIGN PATENT DOCUMENTS

| | | | | |
|---|---|---|---|---|
| JP | 201022185 | A * | 1/2010 | ............ H02K 19/26 |
| JP | 2010045956 | A * | 2/2010 | ............... H02K 3/51 |
| JP | 2015006103 | A * | 1/2015 | ............. H02P 27/06 |

* cited by examiner

| PATTERN | | 1 | 2 | 3 | 4 |
|---|---|---|---|---|---|
| FIELD COIL GENERATED VOLTAGE DIRECTION | e2 | ↑ | ↓ | ↑ | ↓ |
| | e1 | ↑ | ↑ | ↓ | ↓ |
| TOTAL VOLTAGE | | INCREASE | CANCELING DIRECTION | CANCELING DIRECTION | INCREASE |
| GENERATED CURRENT | | LARGE | CHARGING AND DISCHARGING THROUGH CAPACITOR | CHARGING AND DISCHARGING THROUGH CAPACITOR | LARGE |
| CURRENT CONVERSION EFFICIENCY | | ○ | ○ | ○ | ○ |

FIELD WINDING TYPE ROTARY MACHINE

CROSS-REFERENCE TO RELATED APPLICATION

The present application is based on Japanese Patent Application No. 2016-175786, filed on Sep. 8, 2016, the entire contents of which are incorporated herein by reference.

BACKGROUND

1. Technical Field

The present disclosure relates to a field winding type rotary machine.

2. Background Art

A field winding type rotary machine includes a stator and a rotor. The stator has a stator core and a stator coil wound on the stator core. The rotor has a rotor core and a rotor field coil wound on the rotor core. The field winding type rotary machine generates a magnetic field by energization of the stator coil.

SUMMARY

The present disclosure provides a field winding type rotary machine. In the present disclosure, a field winding type rotary machine includes a stator having a stator core and a stator coil, a rotor having a rotor core and a rotor field coil, and a rectifier element connected between both ends of the rotor field coil. The field winding type rotary machine includes a capacitor having one end connected to one end of the rectifier element and another end connected to an intermediate point of the rotor field coil.

DETAILED DESCRIPTION OF THE PREFERRED EMBODIMENTS

Figure 1:
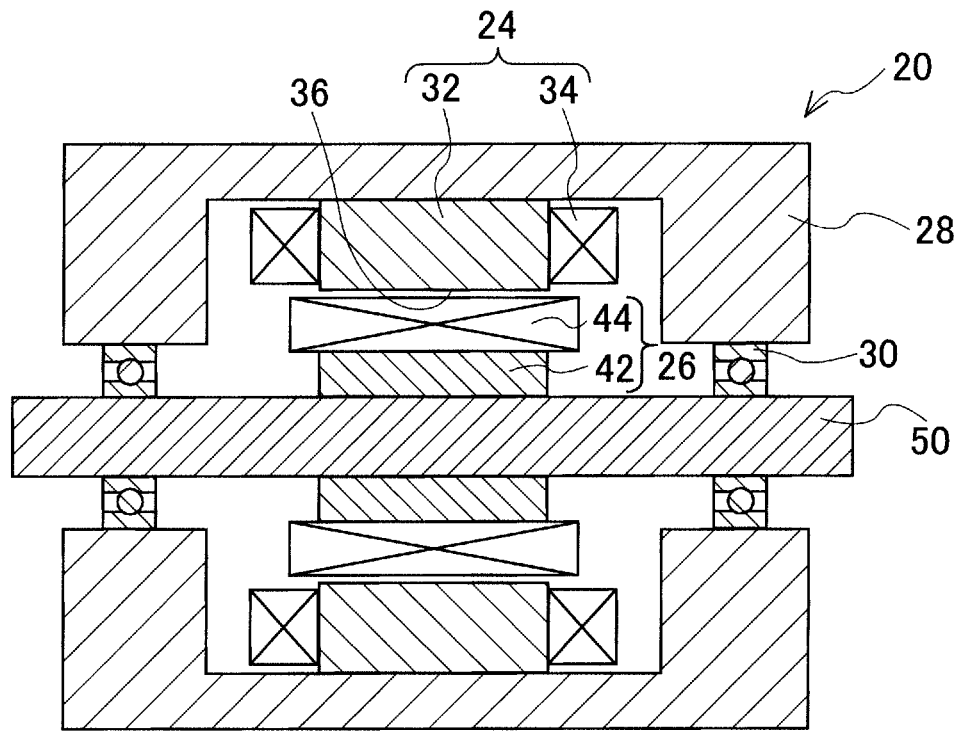
FIG. 1 is an overall configuration diagram of a field winding type rotary machine according to a first embodiment.

The inventor of the present disclosure has studied the following technique as a field winding type rotary machine capable of preventing occurrence of excitation energy loss.

For example, a field winding type rotary machine includes a stator and a rotor, and generates a magnetic field by energization of a stator coil. The stator has a stator core and a stator coil wound on the stator core. The rotor has a rotor core and a rotor field coil wound on the rotor core. The rotor field coil is short-circuited through a diode that is a rectifier element. That is, a diode is connected between both ends of the rotor field coil.

The above field winding type rotary machine includes an inverter circuit and a control circuit. The inverter circuit is connected to the stator coil. The control circuit controls the inverter circuit so that a current depending on a rotation position of the rotor flows through the stator coil. The current flowing through the stator coil is a sum of a fundamental current (that is, synchronous current) and an excitation current. The fundamental current is a current component for generating a rotational torque. The excitation current is a current component for rotor excitation. The excitation current is a current having a shorter cycle (that is, a higher frequency) than the fundamental current and is shaped into a pulsed waveform. When the excitation current flows through the stator coil, an excitation magnetic flux interlinks with a main magnetic pole of the rotor core. Then, a voltage is generated in the rotor field coil to induce an excitation current.

As described above, the diode is connected between both ends of the rotor field coil. Accordingly, even if an AC voltage is generated in the rotor field coil due to fluctuation of the excitation magnetic flux, a current flows only in one direction through the rotor field coil. This excites the rotor core in a predetermined direction to form a pair of field poles (specifically, an N pole and an S pole). A field magnetic flux for forming the pair of field poles is formed by feeding the excitation current for rotor excitation to the stator coil and rectification of the current in the rotor field coil.

Thus, the above field winding type rotary machine receives the excitation magnetic flux from the stator by the rotor field coil, and rectifies the current in one direction by the diode to form the field pole. In the rotary machine, to generate a rotational torque, the excitation magnetic flux is made to interlink with the main magnetic pole of the rotor core to excite the rotor core. The excitation of the rotor core is performed by superimposing the pulsed excitation current with the fundamental current to induce the excitation current in the rotor field coil.

The rotor field coil of the field pole has an inductance. The rotor field coil of each pole constitutes a partial inductance in each pole. Magnetic fluxes flowing through the field pole include a leakage magnetic flux, a harmonic magnetic flux, and the like. Accordingly, directions of voltages generated in respective partial inductances of the rotor field coil are not uniform and vary depending on time and rotor rotation position. When voltages canceling each other are generated in the respective partial inductances of the rotor field coil, the voltage of the entire rotor field coil is lowered and the excitation current is decreased. As a result, a loss of excitation energy may occur.

The present disclosure provides a field winding type rotary machine capable of preventing occurrence of excitation energy loss when the voltages generated in the respective partial inductances of the rotor field coil cancel each other.

A field winding type rotary machine, which is one aspect of technique of the present disclosure, includes a stator having a stator core and a stator coil wound on the stator core, a rotor having a rotor core and a rotor field coil wound on the rotor core, and a rectifier element connected between both ends of the rotor field coil. The field winding type rotary machine includes a capacitor having one end (first terminal) connected to one end (anode terminal) of the rectifier element and another end (second terminal) connected to an intermediate point (predetermined position) of the rotor field coil.

According to this configuration, when voltages generated in the respective partial inductances of the rotor field coil due to the leakage magnetic flux, harmonic magnetic flux, and the like cancel each other, the field winding type rotary machine of the present disclosure stores an excitation energy depending on the voltages canceling each other in a capacitor. After that, when the voltage directions switch and the voltages are in directions canceling each other, the field winding type rotary machine of the present disclosure releases the energy stored in the capacitor to the rotor field coil and converts the energy into an excitation current that excites the rotor core. Thereby, in the field winding type rotary machine of the present disclosure, occurrence of the excitation energy loss when the voltages generated in the respective partial inductances of the rotor field coil cancel each other can be prevented.

In the field winding type rotary machine, which is one aspect of technique of the present disclosure, a current flowing through the stator coil is a current obtained by superimposing a fundamental current for generating a rotating torque and a harmonic current having a shorter cycle than the fundamental current.

According to this configuration, when a harmonic current flows through the stator coil, the field winding type rotary machine of the present disclosure generates an excitation magnetic flux depending on the harmonic current. Thus, in the field winding type rotary machine of the present disclosure, the excitation current that generates an AC voltage in the rotor field coil to excite the rotor core can be induced.

In the field winding type rotary machine, which is one aspect of technique of the present disclosure, the rotor field coil has a first field coil part and a second field coil part. The first field coil part is connected to a capacitor in parallel. The second field coil part is connected between the other end (cathode terminal) of the rectifier element and the other end of the capacitor. The first field coil part is disposed on a side closer to (at a position closer to) a main magnetic pole of the rotor core than to the second field coil part.

According to this configuration, in the field winding type rotary machine of the present disclosure, when leakage magnetic flux, harmonic magnetic flux, or the like is generated, a difference in flux content between the first field coil part and the second field coil part becomes large. As a result, in the field winding type rotary machine of the present disclosure, energy stored in the capacitor can be increased by the difference in flux content. Thus, in the field winding type rotary machine of the present disclosure, a field current can be effectively obtained.

In the field winding type rotary machine, which is one aspect of technique of the present disclosure, the rotor field coil has a first field coil part and a second field coil part. The first field coil part is connected to a capacitor in parallel. The second field coil part is connected between the other end of the rectifier element and the other end of the capacitor. The first field coil part is disposed on a side farther from (at a position farther from) the stator core than from the second field coil part.

According to this configuration, in the field winding type rotary machine of the present disclosure, when leakage magnetic flux, harmonic magnetic flux, or the like is generated, a difference in flux content between the first field coil part and the second field coil part becomes large. As a result, in the field winding type rotary machine of the present disclosure, energy stored in the capacitor can be increased by the difference in flux content. Thus, in the field winding type rotary machine of the present disclosure, a field current can be effectively obtained.

In the field winding type rotary machine, which is one aspect of technique of the present disclosure, the rotor core has a plurality of main magnetic poles and an auxiliary pole disposed between the main magnetic poles. The rotor core includes a magnet. The magnet is provided in the auxiliary pole and magnetized in a direction of canceling the leakage magnetic flux generated between the main magnetic poles.

According to this configuration, in the field winding type rotary machine of the present disclosure, leakage of magnetic flux across the stator side and the rotor side between the main magnetic poles can be suppressed by the magnet provided in the auxiliary pole. Therefore, in the field winding type rotary machine of the present disclosure, the magnetic flux flowing through the field pole can be efficiently passed to the main magnetic pole. Thus, in the field winding type rotary machine of the present disclosure, a field current can be effectively obtained.

The foregoing and other features and advantages of the present disclosure will become more apparent in the light of the following detailed description of preferred embodiments thereof as discussed and illustrated in the accompanying drawings.

Referring to FIG. 1 to FIG. 16, specific embodiments of a field winding type rotary machine which is a technical mode of the present disclosure will be described in detail below.

First Embodiment

In the present embodiment, a field winding type rotary machine 20 is, for example, a synchronous generator motor mounted to a vehicle or the like. In the following, the field winding type rotary machine 20 is simply referred to as rotary machine 20. The rotary machine 20 is a device that generates a driving force for driving a vehicle by being supplied with an electric power from a power supply 22, such as a battery. The rotary machine 20 is a device that generates an electric power for charging a battery by being supplied with a driving force from an engine of the vehicle. The rotary machine 20 includes, as shown in FIG. 1, a stator 24, a rotor 26, a housing 28, and a bearing 30.

Figure 3:
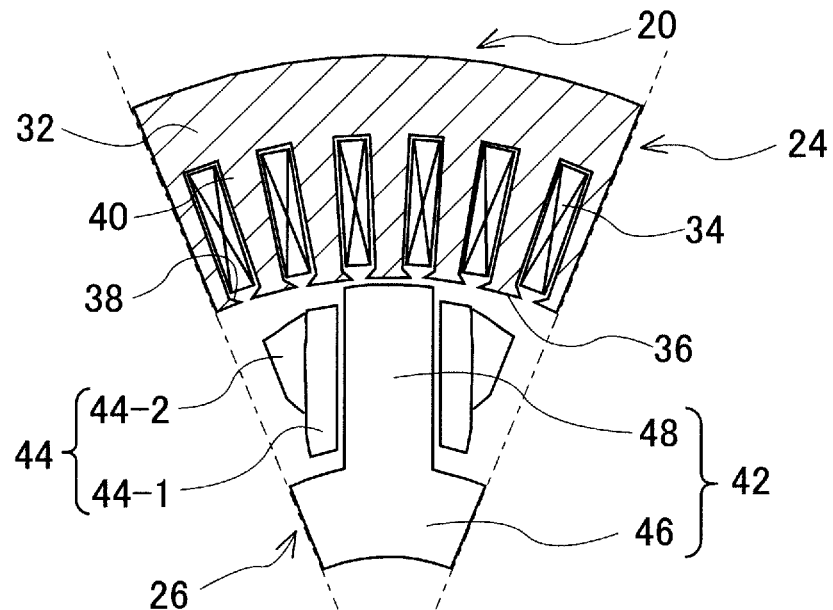
FIG. 3 is a cross-sectional view when the field winding type rotary machine of the first embodiment is cut by a plane extending in a direction perpendicular to a rotation axis.

The stator 24 is housed in a space surrounded by the housing 28 and fixed to the housing 28. The stator 24 has a stator core 32 and a stator coil 34. The stator core 32 constitutes a part of flux path through which a magnetic flux flows. The stator core 32 is formed into a hollow cylindrical shape having a hole 36 in its axial center. As shown in FIG. 3, the stator core 32 has slots 38 and teeth 40. The slots 38 is opened radially inward and extends along the axial direction. A plurality of slots 38 is provided in a circumferential direction, and they are arranged so as to be aligned with one another at every predetermined angle. The slots 38 houses a linear portion of the stator coil 34. The stator coil 34 is wound around the teeth 40 of the stator core 32. The stator coil 34 has a phase winding for each of three phases U, V, and W.

The rotor 26 is housed rotatably in the hole 36 of the stator core 32. The rotors 26 are arranged opposite to each other on the radially inside of the stators 24 with a predetermined air gap. The rotor 26 is supported rotatably by the housing 28 via the bearings 30. The rotor 26 has a rotor core 42 and a rotor field coil 44. The rotor core 42 constitutes a part of flux path through which a magnetic flux flows.

The rotor core 42 has a boss part 46 and salient pole parts 48. The boss part 46 is formed into a cylindrical shape and has a rotor shaft 50 inserted into its hollow hole. The salient pole parts 48 protrudes radially outward from the boss part 46. A plurality of salient pole parts 48 is provided in a circumferential direction and they are arranged so as to be aligned with one another at every predetermined interval. The salient pole parts 48 is a main magnetic pole forming a pair of field poles (specifically, N pole and S pole). The rotor field coil 44 is wound around the salient pole parts 48 of the rotor core 42. The rotor field coil 44 is wound so as to surround the rotor core 42. The rotor field coil 44 is wound intensively for each salient pole part 48.

Figure 2:
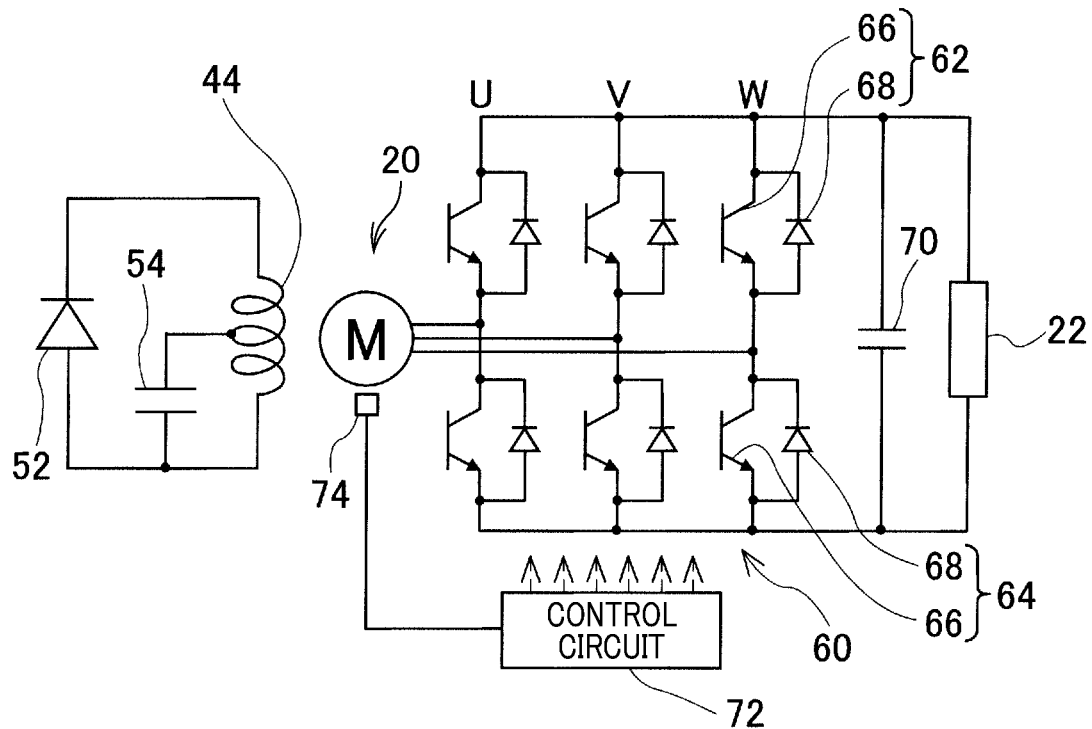
FIG. 2 is a circuit diagram of the field winding type rotary machine of the first embodiment.
Figure 6:
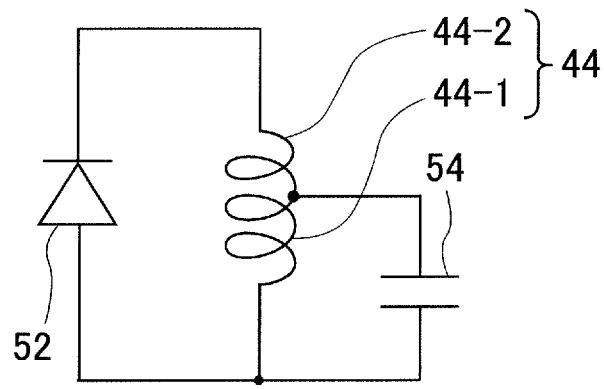
FIG. 6 is a circuit diagram including a rotor field coil provided in the field winding type rotary machine of the first embodiment.

As shown in FIG. 2 and FIG. 6, the rotary machine 20 includes a rectifier element 52. The rectifier element 52 is a diode connected between both ends of the rotor field coil 44. An anode terminal of the rectifier element 52 is connected to one end (first terminal) of the rotor field coil 44. A cathode terminal of the rectifier element 52 is connected to the other end (second terminal) of the rotor field coil 44. The rectifier element 52 has a function of half-wave rectifying an AC voltage induced in the rotor field coil 44, and limiting the direction of current flowing through the rotor field coil 44 into one direction. By this function of the rectifier element 52, the salient pole part 48 is excited to produce either an N pole or an S pole. The salient pole parts 48 are excited so that N-pole salient pole parts 48 and S-pole salient pole parts 48 are alternately arranged in the circumferential direction, respectively.

The rotary machine 20 includes a capacitor 54. The capacitor 54 has one end (first terminal) connected to the anode terminal of the rectifier element 52. The capacitor 54 has the other end (second terminal) connected to any point (predetermined position) of the rotor field coil 44. The capacitor 54 is a passive element capable of storing an electric charge. A connection position between the other end of the capacitor 54 and the rotor field coil 44 is desirably a boundary position for dividing the rotor field coil 44 into the following portions. Specifically, it is desirably a boundary position for dividing the rotor field coil 44 into a portion easily affected by a leakage magnetic flux, a harmonic magnetic flux, and the like of magnetic fluxes flowing through the field pole and a portion hardly affected by them. The circuit of the rotor field coil 44, the rectifier element 52, and the capacitor 54 may be arranged for each pole, or for each pair of poles, and may be arranged as one set altogether.

The rotor field coil 44 has a first field coil part 44-1 and a second field coil part 44-2. The first field coil part 44-1 is connected to the capacitor 54 in parallel. The second field coil part 44-2 is connected between the cathode terminal of the rectifier element 52 and the other end of the capacitor 54. When the direction of a voltage e1 generated between both ends of the first field coil part 44-1 and the direction of a voltage e2 generated between both ends of the second field coil part 44-2 are opposite to each other and the voltages e1 and e2 cancel each other, the capacitor 54 has a function of storing an excitation energy depending on the voltages canceling each other.

The first field coil part 44-1 and the second field coil part 44-2 are obtained by dividing the rotor field coil 44 into portions described below. Specifically, the rotor field coil 44 is divided into a portion easily affected by the leakage magnetic flux, harmonic magnetic flux, and the like of the magnetic fluxes flowing through the field pole and a portion hardly affected by them. The first field coil part 44-1 is disposed on a side close (at a position close) to the salient pole part 48 of the rotor core 42 in the circumferential direction. The second field coil part 44-2 is disposed on a side far (at a position far) from the salient pole part 48 of the rotor core 42 in the circumferential direction. That is, the first field coil part 44-1 is disposed on a side closer to the salient pole part 48 of the rotor core 42 than to the second field coil part 44-2.

The first field coil part 44-1 and the second field coil part 44-2 may be disposed, for example, such that the first field coil part 44-1 is wound around the salient pole part 48 of the rotor core 42 and then the second field coil part 44-2 is wound outside the first field coil part 44-1 in the circumferential direction. The first field coil part 44-1 and the second field coil part 44-2 may be obtained by dividing one winding with the connection position with the other end of the capacitor 54 as a boundary. The first field coil part 44-1 and the second field coil part 44-2 may be obtained by joining different windings (for example, two windings) at the connection position with the other end of the capacitor 54.

An inverter circuit 60 is connected to the rotary machine 20. The inverter circuit 60 is connected to the power supply 22 in parallel. The inverter circuit 60 is connected to the stator coil 34 and is a circuit that applies voltages to respective phase windings of phases U, V, and W of the stator coil 34. The inverter circuit 60 has an upper arm element 62 and a lower arm element 64 which are connected in series between both ends of the power supply 22. The three upper arm elements 62 and three lower arm elements 64 are provided corresponding to the respective phase windings of phases U, V, and W.

Each of the upper arm elements 62 and each of the lower arm elements 64 includes a switching element 66, such as an insulated-gate type bipolar transistor (that is, IGBT) or a MOS field effect transistor, and a flywheel diode 68. In each of phases U, V, and W, the switching element 66 of the upper arm element 62 and the switching element 66 of the lower arm element 64 are turned on/off in opposite phases to each other. In each of phases U, V, and W, the switching element 66 of the upper arm element 62 is turned on during a predetermined period with a predetermined phase difference.

A smoothing capacitor 70 is connected between both ends of the inverter circuit 60. The smoothing capacitor 70 is connected between both ends of the power supply 22 and is connected to the power supply 22 in parallel. The smoothing capacitor 70 smooths a voltage generated between both ends of the inverter circuit 60.

A control circuit 72 is connected to the inverter circuit 60. The control circuit 72 is connected to the respective switching elements of the upper arm elements 62 and lower arm elements 64 of the inverter circuit 60, and controls the inverter circuit 60. The control circuit 72 is connected with a position sensor 74 for detecting a rotation position of the rotor 26. The control circuit 72 drives the inverter circuit 60 so that a desired current flows through the stator coil 34, based on the rotation position of the rotor 26 obtained from the position sensor 74. The inverter circuit 60 applies voltages to respective phase windings of phases U, V, and W so that a desired rotating magnetic field is generated from the stator coil 34 by the switching element 66 being driven according to a drive command from the control circuit 72.

A description will now be given of an operation of the rotary machine 20 of the present embodiment.

Figure 4:
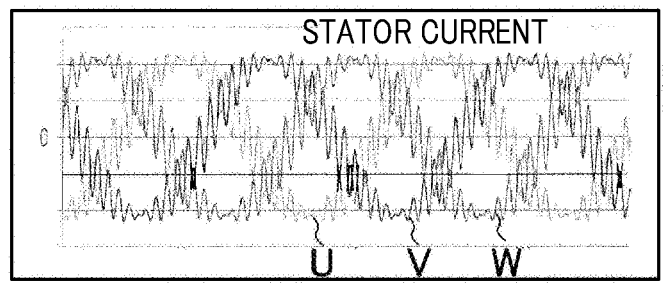
FIG. 4 is a diagram showing one example of a temporal change of a phase current flowing through a stator coil in the field winding type rotary machine of the first embodiment.
Figure 5:
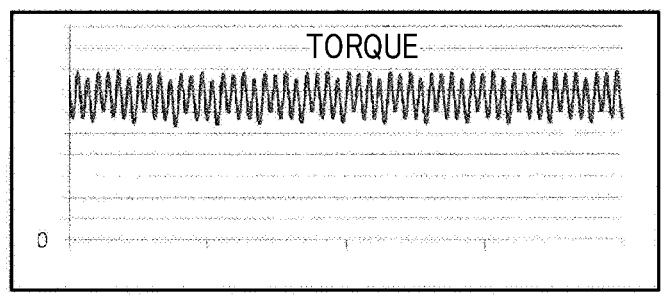
FIG. 5 is a diagram showing a temporal change of a rotating torque generated when a phase current is made to flow in a waveform shown in FIG. 4 through the stator coil in the field winding type rotary machine of the first embodiment.

The control circuit 72 feeds an excitation current that is a current component for rotor excitation through the stator coil 34 to induce an AC voltage at the rotor field coil 44. This excitation current is different from a fundamental current (that is, synchronous current) that is a current component for generating a rotating torque. As shown in FIG. 4, the current flowing through the stator coil 34 is a sum of a fundamental current and the excitation current. The excitation current for rotor excitation is a current having a shorter cycle (that is, a higher frequency) than the fundamental current, and also a current having a smaller amplitude than the fundamental current. This excitation current is a current that pulsates with respect to the fundamental current and is a harmonic current with respect to the fundamental current.

The control circuit 72 controls the inverter circuit 60 so that a current obtained by superimposing the fundamental current for generating a rotating torque with the harmonic current having the shorter cycle than the fundamental current flows through the stator coil 34. The control circuit 72 controls the amplitude and cycle of each of the fundamental current and the harmonic current independently of each other.

When the fundamental current flows from the inverter circuit 60 through each phase winding of the stator coil 34 according to the drive command of the control circuit 72, the rotation magnetic field that rotates the rotor 26 is generated. When the harmonic current flows through each phase winding of the stator coil 34, an AC magnetic field depending on the harmonic current is generated to generate the excitation magnetic flux. In this case, the excitation magnetic flux interlinks with the salient pole part 48 of the rotor core 42, and an AC voltage is generated at the rotor field coil 44 to induce the field current.

The rectifier element 52 is connected between both ends of the rotor field coil 44, and the rotor field coil 44 is short-circuited through the rectifier element 52. Therefore, as described above, even if an AC voltage is generated at the rotor field coil 44, a current flows only in one direction through the rotor field coil 44. Thereby, the rotor core 42 is excited in a predetermined direction to form a pair of field poles in the rotor core 42. The field magnetic flux for forming this pair of field poles is formed by applying of the excitation current for rotor excitation to the stator coil 34 and rectifying of current by the rotor field coil 44.

The rotor field coil 44 has an inductance. That is, the rotor field coil 44 of each pole constitutes a partial inductance in each pole. Magnetic fluxes flowing through the field pole include a leakage magnetic flux, a harmonic magnetic flux, and the like. Therefore, the amounts and directions of the penetrating magnetic fluxes are different from one another depending on the position of the rotor field coil 44. The directions of voltages generated in the respective partial inductances of the rotor field coil 44 are not uniform and vary depending on the time and rotor rotation position.

Figures 9, 10:
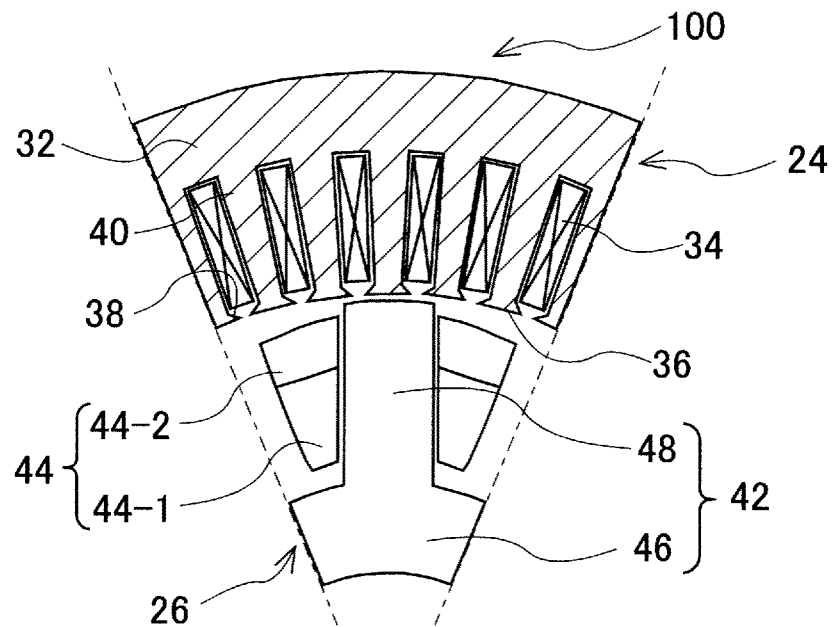
FIG. 9 is a diagram showing a relation among a voltage direction of the rotor field coil, a total voltage, a generated current, and a current conversion efficiency in the field winding type rotary machine of the first embodiment.
FIG. 10 is a cross-sectional view when a field winding type rotary machine of a second embodiment is cut by a plane extending in a direction perpendicular to a rotation axis.

As shown in FIG. 9, the directions of voltages generated at the rotor field coil 44 have four patterns. Specifically, the directions include a case (pattern 1 and pattern 4) in which the direction of the voltage e1 generated at the first field coil part 44-1 and the direction of the voltage e2 generated at the second field coil part 44-2 are the same, and a case (pattern 2 and pattern 3) in which the directions are opposite to each other. Then, as shown in the pattern 2 and the pattern 3, when voltages canceling each other are generated in the respective partial inductances of the rotor field coil 44, the total voltage of the rotor field coil 44 decreases to reduce the excitation current. As a result, a loss of excitation energy may occur.

In contrast, in the rotary machine 20 of the present embodiment, the rectifier element 52 is connected between both ends of the rotor field coil 44, and the capacitor 54 is connected between the anode terminal of the rectifier element 52 and any point of the rotor field coil 44. That is, the rotary machine 20 is provided with the capacitor 54 having one end connected to the anode terminal of the rectifier element 52 and the other end connected to any point of the rotor field coil 44.

Figure 7:
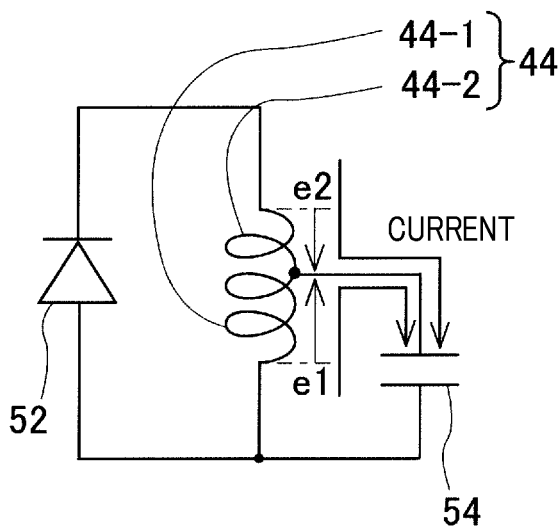
FIG. 7 is a diagram for explaining that a capacitor is charged in a direction in which voltages generated in respective partial inductances of the rotor field coil cancel each other in the field winding type rotary machine of the first embodiment.

In such a structure of the rotary machine 20, when the voltage direction is the pattern 2, the current flowing through the first field coil part 44-1 and the current flowing through the second field coil part 44-2 flow toward the capacitor 54. Specifically, as shown in FIG. 7, the voltage directions are opposite to each other between the first field coil part 44-1 and the second field coil part 44-2 which are divided at the connection position between the other end of the capacitor 54 and the rotor field coil 44. Thus, the voltages e1 and e2 cancel each other. Then, these voltages e1 and e2 are applied in the first field coil part 44-1 and the second field coil part 44-2 respectively so that the currents flow from the connection portion sides with the rectifier element 52 to the connection portion side with the other end of the capacitor 54. In such a case, in the rotary machine 20 of the present embodiment, the currents flowing through the first field coil part 44-1 and the second field coil part 44-2 flow toward the capacitor 54, respectively. As a result, in the rotary machine 20 of the present embodiment, the excitation energy depending on the voltages canceling each other between the first field coil part 44-1 and the second field coil part 44-2 is stored in the capacitor 54 to charge the capacitor 54.

Figure 8:
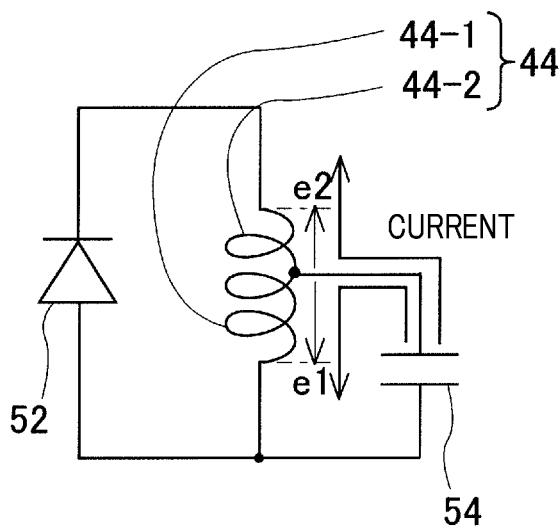
FIG. 8 is a diagram for explaining that a capacitor is charged in a direction in which voltages generated in respective partial inductances of the rotor field coil cancel each other in the field winding type rotary machine of the first embodiment.

After the charging of the capacitor 54, when the voltage direction is the pattern 3, the currents flow from the capacitor 54 through the first field coil part 44-1 and the second field coil part 44-2 respectively, in the rotary machine 20. Specifically, as shown in FIG. 8, the voltage directions of the first field coil part 44-1 and the second field coil part 44-2 are switched. Then, in directions of canceling with each other, these voltages e1 and e2 are applied in the first field coil part 44-1 and the second field coil part 44-2 respectively so that the currents flow from the connection portion side with the other end of the capacitor 54 to the connection portion sides with the rectifier element 52. In such a case, in the rotary machine 20 of the present embodiment, the currents flow from the capacitor 54 side through the first field coil part 44-1 and the second field coil part 44-2 respectively. As a result, in the rotary machine 20 of the present embodiment, the energy stored in the capacitor 54 is released to the first field coil part 44-1 and the second field coil part 44-2 respectively to discharge the capacitor 54.

As described above, in the rotary machine 20 of the present embodiment, when the voltage e1 generated at the first field coil part 44-1 and the voltage e2 generated at the second field coil part 44-2 cancel each other due to the leakage magnetic flux, harmonic magnetic flux and the like, a voltage acting on the entire rotor field coil 44 decreases. However, the rotary machine 20 can store the excitation energy depending on the voltages canceling each other in the capacitor 54. Then, after the charging of the capacitor 54 and when the above voltage directions are switched, the rotary machine 20 releases the energy stored in the capacitor 54 to the rotor field coil 44. Thus, in the rotary machine 20 of the present embodiment, the energy stored in the capacitor 54 is converted into an excitation current that excites the rotor core 42.

Therefore, according to the rotary machine 20 of the present embodiment, when voltages in directions of canceling each other are generated at respective partial inductances of the rotor field coil 44, excitation energy generated in the rotor field coil 44 is efficiently converted into excitation current. Thereby, the rotary machine 20 can ensure field current. Hence, the rotary machine 20 of the present embodiment can prevent occurrence of excitation energy loss accompanying reduction of excitation current when the voltages in directions of canceling each other are generated at the respective partial inductances of the rotor field coil 44. Further, the rotary machine 20 can efficiently excite the rotor core 42 even if the voltages cancel each other.

If the field current can be ensured as described above, the rotary machine 20 of the present embodiment can suppress the harmonic current to be superimposed on the fundamental current flowing through the stator coil 34, which is necessary for forming a field pole on the rotor core 42, to a small amplitude. Hence, the rotary machine 20 can reduce a torque ripple smaller than when the amplitude of the harmonic current is large (refer to FIG. 5).

In the rotary machine 20 of the present embodiment, the first field coil part 44-1 and the second field coil part 44-2 of the rotor field coil 44 are disposed at positions as described below with respect to the salient pole part 48 of the rotor core 42. Specifically, the first field coil part 44-1 connected to the capacitor 54 in parallel is disposed on a side close to the salient pole part 48 of the rotor core 42 in the circumferential direction. The second field coil part 44-2 connected between the cathode terminal of the rectifier element 52 and the other end of the capacitor 54 is disposed on a side far from the salient pole part 48 of the rotor core 42 in the circumferential direction. The magnetic fluxes penetrating the salient pole part 48 of the rotor core 42 include a leakage magnetic flux and the like. Therefore, the amounts and directions of the penetrating magnetic fluxes are different from one another depending on the position of the rotor field coil 44. This phenomenon is particularly remarkable in the harmonic magnetic flux. Specifically, the difference in flux content is large between the side close to the salient pole part 48 of the rotor field coil 44 (that is, the main magnetic pole side) and the side far from the salient pole part 48 (that is, between the main magnetic poles). Hence, according to the structure of the rotary machine 20, the energy to be stored in the capacitor 54 can be increased accordingly. Thus, in the rotary machine 20 of the present embodiment, a field current can be effectively obtained.

As is clear from the above description, the rotary machine 20 of the present embodiment is a field winding type rotary machine including the stator 24 having the stator core 32 and the stator coil 34 wound on the stator core 32, the rotor 26 having the rotor core 42 and the rotor field coil 44 wound on the rotor core 42, and the rectifier element 52 connected between both ends of the rotor field coil 44. In addition, the rotary machine 20 includes the capacitor 54 having one end connected to the anode terminal of the rectifier element 52 and the other end connected to any point of the rotor field coil 44.

According to this configuration, the rotary machine 20 of the present embodiment stores excitation energy depending on the voltages canceling each other in the capacitor 54, when voltages generated in the respective partial inductances of the rotor field coil 44 cancel each other due to the leakage magnetic flux, harmonic magnetic flux, and the like. After that, the rotary machine 20 releases the energy stored in the capacitor 54 to the rotor field coil 44 and converts the energy into excitation current that excites the rotor core 42, when the voltage directions are switched to be in directions in which the voltages cancel each other. Thus, the rotary machine 20 can prevent occurrence of energy loss when the voltages generated at the respective partial inductances of the rotor field coil 44 cancel each other.

In the rotary machine 20 of the present embodiment, the current flowing through the stator coil 34 is obtained by superimposing a fundamental current for generating a rotating torque with a harmonic current having a shorter cycle than the fundamental current.

According to the configuration, the rotary machine 20 of the present embodiment generates excitation magnetic flux depending on the harmonic current when the harmonic current flows through the stator coil 34. Therefore, in the rotary machine 20, an AC voltage can be generated in the rotor field coil 44 to induce excitation current that excites the rotor core 42.

In addition, in the rotary machine 20 of the present embodiment, the rotor field coil 44 has the first field coil part 44-1 and the second field coil part 44-2. The first field coil part 44-1 is connected to the capacitor 54 in parallel. The second field coil part 44-2 is connected between the cathode terminal of the rectifier element 52 and the other end of the capacitor 54. The first field coil part 44-1 is disposed on the side closer to the salient pole part 48 of the rotor core 42 than to the second field coil part 44-2.

According to the configuration, in the rotary machine 20 of the present embodiment, the difference in flux content becomes large between the first field coil part 44-1 and the second field coil part 44-2 when a leakage magnetic flux, a harmonic magnetic flux, or the like is generated. As a result, the rotary machine 20 can increase energy to be stored in the capacitor 54 by the difference in flux content. Thus, in the rotary machine 20, a field current can be effectively obtained.

In the rotary machine 20 of the present embodiment, the first field coil part 44-1 and the second field coil part 44-2 of the rotor field coil 44 are disposed at positions as described below with respect to the salient pole part 48 of the rotor core 42. Specifically, the first field coil part 44-1 connected to the capacitor 54 in parallel is disposed on the side close to the salient pole part 48 of the rotor core 42 in the circumferential direction. The second field coil part 44-2 connected between the cathode terminal of the rectifier element 52 and the other end of the capacitor 54 is disposed on a side far from the salient pole part 48 of the rotor core 42 in the circumferential direction. However, the technique of the present disclosure is not limited to this. For example, the first field coil part 44-1 may be disposed on the side far from the salient pole part 48 of the rotor core 42 in the circumferential direction, and the second field coil part 44-2 may be disposed on the side close to the salient pole part 48 of the rotor core 42 in the circumferential direction. That is, the first field coil part 44-1 may be disposed on the side farther from the salient pole part 48 of the rotor core 42 than from the second field coil part 44-2.

Second Embodiment

In the first embodiment, the first field coil part 44-1 is disposed on the side close to (at a position close to) the salient pole part 48 of the rotor core 42 in the circumferential direction, and the second field coil part 44-2 is disposed on the side far from (at a position far from) the salient pole part 48 of the rotor core 42 in the circumferential direction. Hereinafter, in FIG. 10, for the same constituent part as that described in the above embodiment, the same reference sign is attached, and its description is omitted or simplified.

In contrast, as shown in FIG. 10, in a rotary machine 100 of the present embodiment, a first field coil part 44-1 and a second field coil part 44-2 of a rotor field coil 44 are disposed at positions as described below with respect to a stator core 32. Specifically, the first field coil part 44-1 connected to a capacitor 54 in parallel is disposed on a side far from the stator core 32 in a radial direction. The second field coil part 44-2 connected between the cathode terminal of a rectifier element 52 and the other end (a second terminal) of the capacitor 54 is disposed on a side close to the stator core 32 in the radial direction. That is, the first field coil part 44-1 is disposed on a side farther from (that is, an inner side in the radial direction of) the stator core 32 than from the second field coil part 44-2.

Note that, the first field coil part 44-1 and the second field coil part 44-2 may be, for example, disposed such that the first field coil part 44-1 is wound around the salient pole part 48 of the rotor core 42 and then the second field coil part 44-2 is wound outside the first field coil part 44-1 in the radial direction.

The magnetic fluxes penetrating the salient pole part 48 of the rotor core 42 include a leakage magnetic flux and the like. Therefore, the amounts and directions of the penetrating magnetic fluxes are different from one another depending on the position of the rotor field coil 44. This phenomenon is particularly remarkable in the harmonic magnetic flux. Specifically, the difference in flux content is large between the side close to the stator core 32 of the rotor field coil 44 and the side far from the stator core 32 (that is, the boss part 46 side of the rotor core 42). Hence, also in the structure of the rotary machine 100 of the present embodiment, the energy to be stored in the capacitor 54 can be increased accordingly. Thus, in the rotary machine 100 of the present embodiment, a field current can be effectively obtained.

As is clear from the above description, in the rotary machine 100 of the present embodiment, the rotor field coil 44 has the first field coil part 44-1 and the second field coil part 44-2. The first field coil part 44-1 is connected to the capacitor 54 in parallel. The second field coil part 44-2 is connected between the cathode terminal of the rectifier element 52 and the other end of the capacitor 54. The first field coil part 44-1 is disposed on the side farther from the stator core 32 than from the second field coil part 44-2.

According to the configuration, in the rotary machine 100 of the present embodiment, the difference in flux content becomes large between the first field coil part 44-1 and the second field coil part 44-2, if the leakage magnetic flux, the harmonic magnetic flux, or the like is generated. As a result, the rotary machine 100 can increase energy to be stored in the capacitor 54 by the difference in flux content. Thus, in the rotary machine 100, a field current can be effectively obtained.

Note that, in the rotary machine 100 of the present embodiment, the first field coil part 44-1 and the second field coil part 44-2 of the rotor field coil 44 are disposed at positions as described below with respect to the stator core 32. Specifically, the first field coil part 44-1 connected to a capacitor 54 in parallel is disposed on a side far from the stator core 32 in a radial direction. The second field coil part 44-2 connected between the cathode terminal of the rectifier element 52 and the other end of the capacitor 54 is disposed on the side close to the stator core 32 in the radial direction. However, the technique of the present disclosure is not limited to this. For example, the first field coil part 44-1 may be disposed on the side close to the stator core 32 in the radial direction and the second field coil part 44-2 may be disposed on the side far from the stator core 32 in the radial direction. That is, the first field coil part 44-1 may be disposed on the side closer to (that is, outer side in the radial direction of) the stator core 32 than to the second field coil part 44-2.

Third Embodiment

The magnetic fluxes flowing through the field pole include leakage magnetic fluxes. The leakage magnetic fluxes include magnetic fluxes leaking across a stator 24 side and a rotor 26 side between salient pole parts 48 which are main magnetic poles. Thus, efficient formation of magnetic fluxes may be blocked. Hereinafter, in FIG. 11, for the same constituent part as that described in the above embodiments, the same reference sign is attached, and its description is omitted or simplified.

Figure 11:
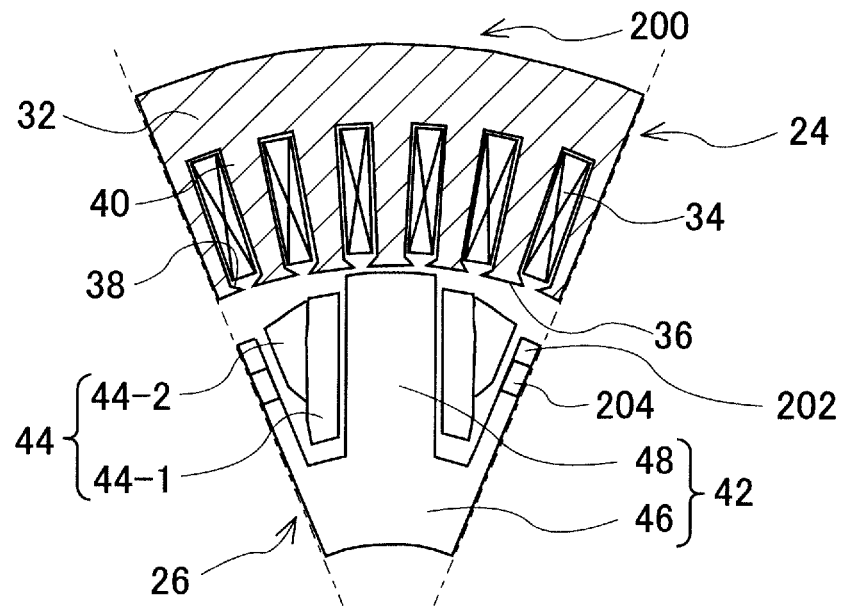
FIG. 11 is a cross-sectional view when a field winding type rotary machine of a third embodiment is cut by a plane extending in a direction perpendicular to a rotation axis.

In contrast, as shown in FIG. 11, in a rotary machine 200 of the present embodiment, a rotor core 42 has a boss part 46 and a plurality of salient pole parts 48, and further has an auxiliary pole part 202. The salient pole parts 48 are main magnetic poles forming one pair of field poles. The auxiliary pole part 202 is disposed between the salient pole parts 48, and is provided for each interval between the salient pole parts 48. The auxiliary pole parts 202 are provided in plurality in the circumferential direction, and are arranged so as to be alternately aligned with the salient pole parts 48 at a predetermined angle. The auxiliary pole part 202 is an auxiliary pole disposed to provide a boundary between the salient pole parts 48 adjacent to each other in the circumferential direction. The auxiliary pole part 202 protrudes from the boss part 46 toward outside in the radial direction.

Note that, the auxiliary pole part 202 may have a smaller circumferential width than the salient pole part 48. In addition, a gap between the tip end of the auxiliary pole part 202 and the tip end of the teeth 40 of the stator core 32 may be larger than an air gap between the tip end of the salient pole part 48 and the teeth 40.

The rotary machine 200 includes a magnet 204. The magnet 204 is provided at the auxiliary pole part 202. The magnet 204 is magnetized in a direction of canceling leakage magnetic flux leaking across the stator 24 side and the rotor 26 side between the salient pole parts 48. The magnet 204 is disposed to be magnetized in the direction of canceling the leakage magnetic flux. The magnet 204 is embedded in the auxiliary pole part 202 such that the N pole is disposed inside the auxiliary pole part 202 in the radial direction and the S pole is disposed outside thereof in the radial direction. The magnet 204 has a function of suppressing leakage of the magnetic flux across the stator 24 side and the rotor 26 side between the salient pole parts 48.

In such a structure of the rotary machine 200, the magnet 204 provided in the auxiliary pole part 202 can prevent the magnetic flux from leaking across the stator 24 side and the rotor 26 side between the salient pole parts 48. Therefore, according to the rotary machine 200 of the present embodiment, the magnetic flux flowing through the field pole can be efficiently passed. Thus, in the rotary machine 200, a field current can be effectively obtained.

In the rotary machine 200 of the present embodiment, the first field coil part 44-1 and the second field coil part 44-2 of the rotor field coil 44 are disposed at positions as described below with respect to the salient pole part 48 of the rotor core 42. Specifically, the first field coil part 44-1 connected to the capacitor 54 in parallel is disposed on the side close to (at a position close to) the salient pole part 48 of the rotor core 42 in the circumferential direction. The second field coil part 44-2 connected between the cathode terminal of the rectifier element 52 and the other end (second terminal) of the capacitor 54 is disposed on the side far from (at a position far from) the salient pole part 48 of the rotor core 42 in the circumferential direction. However, the technique of the present disclosure is not limited to this. For example, the first field coil part 44-1 may be disposed on the side far from the salient pole part 48 of the rotor core 42 in the circumferential direction, and the second field coil part 44-2 may be disposed on the side close to the salient pole part 48 of the rotor core 42 in the circumferential direction. That is, the first field coil part 44-1 may be disposed on the side farther from the salient pole part 48 of the rotor core 42 than from the second field coil part 44-2.

Fourth Embodiment

In the third embodiment, the first field coil part 44-1 is disposed on the side close to (at a position close to) the salient pole part 48 of the rotor core 42 in the circumferential direction, and the second field coil part 44-2 is disposed on the side far from (at a position far from) the salient pole part 48 of the rotor core 42 in the circumferential direction. Hereinafter, in FIG. 12, for the same constituent part as that described in the above each embodiment, the same reference sign is attached, and its description is omitted or simplified.

Figure 12:
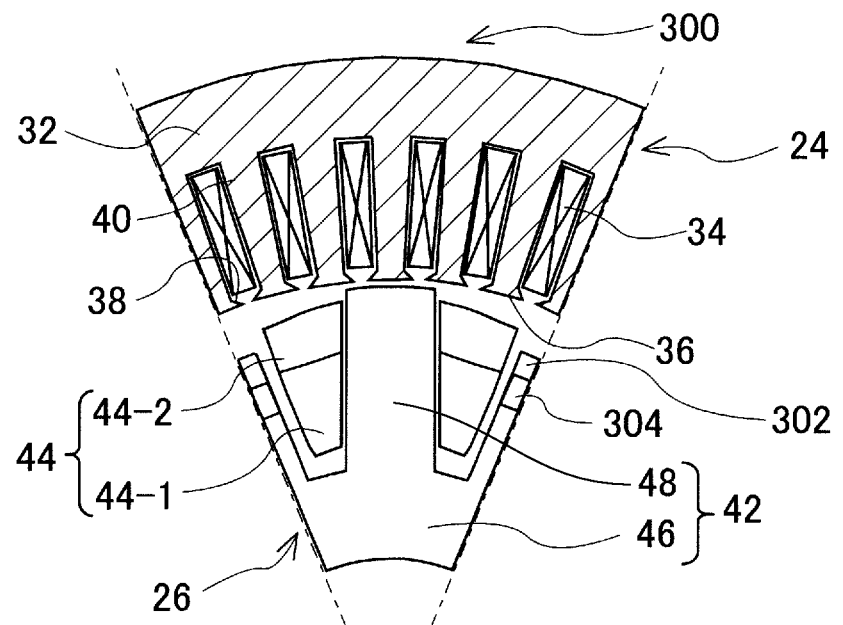
FIG. 12 is a cross-sectional view when a field winding type rotary machine of a fourth embodiment is cut by a plane extending in a direction perpendicular to a rotation axis.

In contrast, as shown in FIG. 12, in a rotary machine 300 of the present embodiment, a first field coil part 44-1 and a second field coil part 44-2 of a rotor field coil 44 are disposed at positions as described below with respect to a stator core 32. Specifically, the first field coil part 44-1 connected to a capacitor 54 in parallel is disposed on a side far from the stator core 32 in a radial direction. The second field coil part 44-2 connected between the cathode terminal of a rectifier element 52 and the other end (a second terminal) of the capacitor 54 is disposed on a side close to the stator core 32 in the radial direction. That is, the first field coil part 44-1 is disposed on a side farther from (that is, an inner side in the radial direction of) the stator core 32 than from the second field coil part 44-2.

In the rotary machine 300 of the present embodiment, the rotor core 42 has a boss part 46 and a plurality of salient pole parts 48, and further has an auxiliary pole part 302. The salient pole parts 48 are main magnetic poles forming one pair of field poles. As in the auxiliary pole part 202 of the third embodiment, the auxiliary pole part 302 is disposed between the salient pole parts 48, and is provided for each interval between the salient pole parts 48. The auxiliary pole parts 302 are provided in plurality in the circumferential direction and are arranged so as to be alternately aligned with the salient pole parts 48 at a predetermined angle. The auxiliary pole part 302 is an auxiliary pole disposed to provide a boundary between the salient pole parts 48 adjacent to each other in the circumferential direction. The auxiliary pole part 302 protrudes from the boss part 46 toward outside in the radial direction.

The auxiliary pole part 302 may have a smaller circumferential width than the salient pole part 48. In addition, a gap between the tip end of the auxiliary pole part 302 and the tip end of the teeth 40 of the stator core 32 may be larger than an air gap between the tip end of the salient pole part 48 and the teeth 40.

The rotary machine 300 includes a magnet 304. The magnet 304 is provided at the auxiliary pole part 302. The magnet 304 is magnetized in a direction of canceling leakage magnetic flux leaking across the stator 24 side and the rotor 26 side between the salient pole parts 48. The magnet 304 is disposed to be magnetized in the direction of canceling the leakage magnetic flux. The magnet 304 is embedded in the auxiliary pole part 302 such that the N pole is disposed inside the auxiliary pole part 302 in the radial direction and the S pole is disposed outside thereof in the radial direction. The magnet 304 has a function of suppressing leakage of the magnetic flux across the stator 24 side and the rotor 26 side between the salient pole parts 48.

In such a structure of the rotary machine 300, the magnet 304 provided in the auxiliary pole part 302 can prevent the magnetic flux from leaking across the stator 24 side and the rotor 26 side between the salient pole parts 48. Therefore, according to the rotary machine 300 of the present embodiment, the magnetic flux flowing through the field pole can be efficiently passed. Thus, in the rotary machine 300, a field current can be effectively obtained.

As is clear from the above description, in the rotary machine 200 and the rotary machine 300 of the third and fourth embodiments, the rotor core 42 has a plurality of salient pole parts 48 and the auxiliary pole part 202 and the auxiliary pole part 302 disposed between the salient pole parts 48. The rotor core 42 includes the magnet 204 and the magnet 304. The magnet 204, 304 is provided at the auxiliary pole part 202 and the auxiliary pole part 302 and is magnetized in the direction of canceling the leakage magnetic flux generated between the salient pole parts 48.

According to this configuration, in the rotary machine 200 and the rotary machine 300 of the third and fourth embodiments, the magnet 204 and the magnet 304 provided in the auxiliary pole part 202 and the auxiliary pole part 302 can prevent the magnetic flux from leaking across the stator 24 side and the rotor 26 side between the salient pole parts 48. Therefore, the rotary machine 200 and the rotary machine 300 can efficiently pass the magnetic flux flowing through the field pole to the salient pole part 48. Thus, in the rotary machine 200 and the rotary machine 300, a field current can be effectively obtained.

In the rotary machine 300 of the fourth embodiment, the first field coil part 44-1 and the second field coil part 44-2 of the rotor field coil 44 are disposed at positions as described below with respect to the stator core 32. Specifically, the first field coil part 44-1 connected to a capacitor 54 in parallel is disposed on a side far from the stator core 32 in a radial direction. The second field coil part 44-2 connected between the cathode terminal of the rectifier element 52 and the other end of the capacitor 54 is disposed on the side close to the stator core 32 in the radial direction. However, the technique of the present disclosure is not limited to this. For example, the first field coil part 44-1 may be disposed on the side close to the stator core 32 in the radial direction and the second field coil part 44-2 may be disposed on the side far from the stator core 32 in the radial direction. That is, the first field coil part 44-1 may be disposed on the side closer to (that is, outer side in the radial direction of) the stator core 32 than the second field coil part 44-2.

Fifth Embodiment

In the above each embodiment, a capacitor is not connected in parallel to a rectifier element 52 provided in the rotary machine 20. Hereinafter, in FIG. 13, for the same constituent part as that described in the above each embodiment, the same reference sign is attached, and its description is omitted or simplified.

Figure 13:
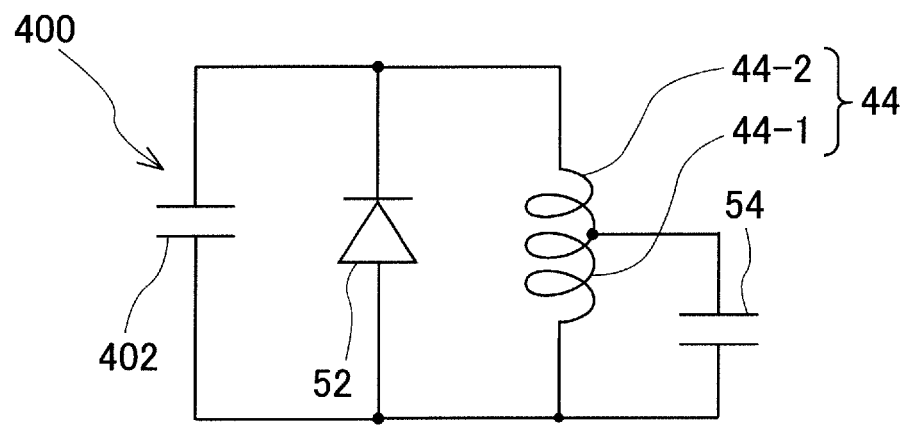
FIG. 13 is a circuit diagram including a rotor field coil provided in a field winding type rotary machine of a fifth embodiment.

In contrast, as shown in FIG. 13, in a rotary machine 400 of the present embodiment, a capacitor 402 is connected to a rectifier element 52 in parallel. The capacitor 402 has a function of smoothing an AC voltage that is induced in a rotor field coil 44 and half-wave rectified by the rectifier element 52 to reduce pulsation. According to the rotary machine 400 provided with such a capacitor 402, it is possible to smooth an AC voltage half-wave rectified by the rectifier element 52 and to reduce its pulsation.

Sixth Embodiment

In the above embodiments, the capacitor 54 is provided having one end (first terminal) connected to the anode terminal of the rectifier element 52 and the other end (second terminal) connected to any point (predetermined position) of the rotor field coil 44. Hereinafter, in FIGS. 14 to 16, for the same constituent part as that described in the above embodiment, the same reference sign is attached, and its description is omitted or simplified.

Figure 14:
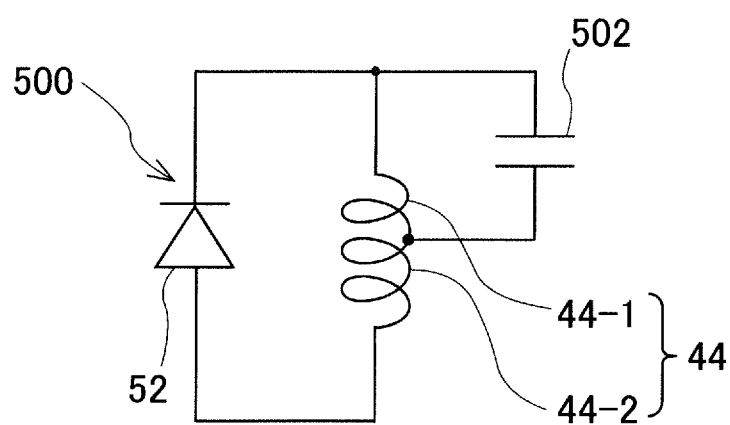
FIG. 14 is a circuit diagram including a rotor field coil provided in a field winding type rotary machine of a sixth embodiment.

In contrast, a rotary machine 500 of the present embodiment includes a capacitor 502 instead of the capacitor 54 in the first embodiment. As shown in FIG. 14, the capacitor 502 has one end (first terminal) connected to the cathode terminal of a rectifier element 52. The capacitor 502 has the other end (second terminal) connected to any point of a rotor field coil 44. The rotor field coil 44 has a first field coil part 44-1 and a second field coil part 44-2. The first field coil part 44-1 is connected to the capacitor 502 in parallel. The second field coil part 44-2 is connected between the anode terminal of the rectifier element 52 and the other end of the capacitor 502.

When the direction of a voltage e1 generated between both ends of the first field coil part 44-1 and the direction of a voltage e2 generated between both ends of the second field coil part 44-2 are opposite to each other and the voltages e1 and e2 cancel each other, the capacitor 502 has a function of storing an excitation energy depending on the voltages canceling each other.

Figure 15:
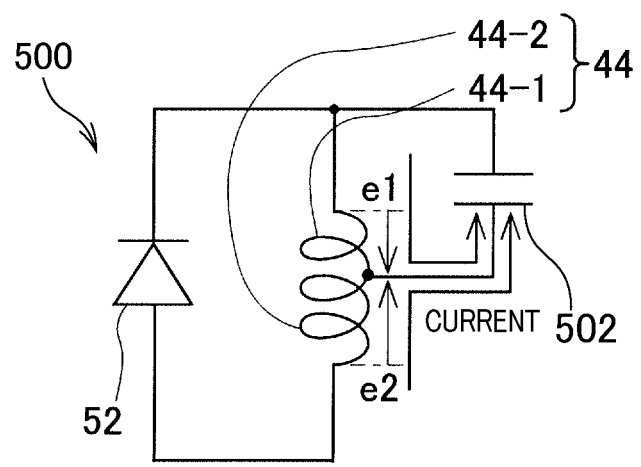
FIG. 15 is a diagram for explaining that a capacitor is charged in a direction in which voltages generated in respective partial inductances of the rotor field coil cancel each other in the field winding type rotary machine of the sixth embodiment.

In such a rotary machine 500, if the voltage direction is the pattern 3, the current flowing through the first field coil part 44-1 and the current flowing through the second field coil part 44-2 flow toward the capacitor 502. Specifically, as shown in FIG. 15, the voltage directions are opposite to each other between the first field coil part 44-1 and the second field coil part 44-2 which are divided at the connection position between the other end of the capacitor 502 and the rotor field coil 44. Thus, the voltages e1 and e2 cancel each other. Then, these voltages e1 and e2 are applied in the first field coil part 44-1 and the second field coil part 44-2 respectively so that the currents flow from the connection portion sides with the rectifier element 52 to the connection portion side with the other end of the capacitor 502. In such a case, in the rotary machine 500 of the present embodiment, the currents flowing respectively through the first field coil part 44-1 and the second field coil part 44-2 flow toward the capacitor 502. As a result, in the rotary machine 500 of the present embodiment, the excitation energy depending on the voltages canceling each other between the first field coil part 44-1 and the second field coil part 44-2 is stored in the capacitor 502 to charge the capacitor 502.

Figure 16:
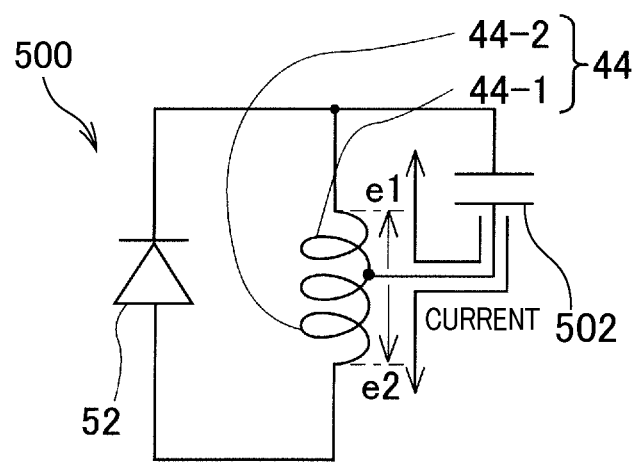
FIG. 16 is a diagram for explaining that a capacitor is charged in a direction in which voltages generated in respective partial inductances of the rotor field coil cancel each other in the field winding type rotary machine of the sixth embodiment.

After the charging of the capacitor 502, when the voltage direction is the pattern 2 the currents flow from the capacitor 502 through the first field coil part 44-1 and the second field coil part 44-2 respectively in the rotary machine 500. Specifically, as shown in FIG. 16, the voltage directions of the first field coil part 44-1 and the second field coil part 44-2 are switched. Then, in directions of canceling with each other, these voltages e1 and e2 are applied in the first field coil part 44-1 and the second field coil part 44-2 respectively so that the currents flow from the connection portion side with the other end of the capacitor 502 to the connection portion sides with the rectifier element 52. In such a case, in the rotary machine 500 of the present embodiment, the currents flow from the capacitor 502 side through the first field coil part 44-1 and the second field coil part 44-2, respectively. As a result, in the rotary machine 500 of the present embodiment, the energy stored in the capacitor 502 is released to the first field coil part 44-1 and the second field coil part 44-2 respectively to discharge the capacitor 502.

Therefore, also in the rotary machine 500 of the present embodiment, when voltages in directions of canceling each other are generated at respective partial inductances of the rotor field coil 44, excitation energy generated in the rotor field coil 44 is efficiently converted into excitation current. Thereby, the rotary machine 500 can ensure field current. Hence, the rotary machine 500 of the present embodiment can prevent occurrence of excitation energy loss accompanying reduction of excitation current when the voltages in directions of canceling each other are generated at the respective partial inductances of the rotor field coil 44. Further, the rotary machine 500 can efficiently excite the rotor core 42 even if the voltages cancel each other. Thus, in the rotary machine 500, the same effects as in the first embodiment can be obtained.

In the sixth embodiment, the first field coil part 44-1 and the second field coil part 44-2 of the rotor field coil 44 are disposed at positions as described below with respect to the salient pole part 48 of the rotor core 42. Specifically, the first field coil part 44-1 connected to the capacitor 502 in parallel is disposed on the side close to (at a position close to) the salient pole part 48 of the rotor core 42 in the circumferential direction. The second field coil part 44-2 connected between the anode terminal of the rectifier element 52 and the other end of the capacitor 502 is disposed on the side far from (at a position far from) the salient pole part 48 of the rotor core 42 in the circumferential direction. However, the technique of the present disclosure is not limited to this. For example, the first field coil part 44-1 may be disposed on the side far from the salient pole part 48 of the rotor core 42 in the circumferential direction, and the second field coil part 44-2 may be disposed on the side close to the salient pole part 48 of the rotor core 42 in the circumferential direction. That is, the first field coil part 44-1 may be disposed on the side farther from the salient pole part 48 of the rotor core 42 than from the second field coil part 44-2.

In addition, for example, the first field coil part 44-1 may be disposed on the side far from the stator core 32 in the radial direction and the second field coil part 44-2 may be disposed on the side close to the stator core 32 in the radial direction. That is, the first field coil part 44-1 may be disposed on the side farther from (that is, inner side in the radial direction of) the stator core 32 than from the second field coil part 44-2.

Inversely, the first field coil part 44-1 may be disposed on the side close to the stator core 32 in the radial direction, and the second field coil part 44-2 may be disposed on the side far from the stator core 32 in the radial direction. That is, the first field coil part 44-1 may be disposed on the side closer to (that is, outer side in the radial direction of) the stator core 32 than to the second field coil part 44-2.

The rotary machine 500 of the sixth embodiment may employ the configuration of the third embodiment or the fourth embodiment.

Further, in each of the above first to sixth embodiments, the rotor field coil 44 is intensively wound for each salient pole part 48. However, the technique of the present disclosure is not limited to this. For example, the technique of the present disclosure may be applied to a rotary machine having a configuration in which the rotor field coil 44 is distributedly wound on some salient pole parts 48.

Further, in the third to sixth embodiments, the magnet of the auxiliary pole part may be configured with an electrical magnet using a coil.

The technique of the present disclosure is not limited to the above-described embodiments and variations. The technique of the present disclosure can be modified variously within a range not deviating from the gist of the disclosure.

What is claimed is:

1. A field winding type rotary machine, comprising:
   a stator having a stator core and a stator coil wound on the stator core;
   a rotor having a rotor core and a rotor field coil wound on the rotor core;
   a rectifier element connected between both ends of the rotor field coil; and
   a capacitor having one end connected to one end of the rectifier element and another end connected to any point of the rotor field coil, wherein
   a connection position between the other end of the capacitor and the rotor field coil is a boundary position that divides the rotor field coil into a portion more affected by a leakage magnetic flux and a harmonic magnetic flux of a magnetic flux flowing through the field pole and a portion less affected by them.

2. The field winding type rotary machine according to claim 1, wherein
   a current flowing through the stator coil is a current obtained by superimposing a fundamental current for generating a rotating torque and a harmonic current having a shorter cycle than the fundamental current.

3. The field winding type rotary machine according to claim 1, wherein
   the rotor field coil has a first field coil part connected to the capacitor in parallel and a second field coil part connected between the other end of the rectifier element and the other end of the capacitor, and
   the first field coil part is disposed on a side closer to a main magnetic pole of the rotor core than to the second field coil part.

4. The field winding type rotary machine according to claim 1, wherein
   the rotor field coil has a first field coil part connected to the capacitor in parallel and a second field coil part connected between the other end of the rectifier element and the other end of the capacitor, and
   the first field coil part is disposed on a side farther from the stator core than from the second field coil part.

5. The field winding type rotary machine according to claim 1, wherein
   the rotor core
   has a plurality of main magnetic poles and an auxiliary pole arranged between the main magnetic poles, and
   includes a magnet provided in the auxiliary pole and magnetized in a direction of canceling a leakage magnetic flux generated between the main magnetic poles in a radial direction.

6. A field winding type rotary machine, comprising:
   a stator having a stator core and a stator coil wound on the stator core;
   a rotor having a rotor core and a rotor field coil wound on the rotor core;
   a rectifier element connected between both ends of the rotor field coil; and
   a capacitor having one end connected to one end of the rectifier element and another end connected to any point of the rotor field coil, wherein
   the rotor field coil has a first field coil part connected to the capacitor in parallel and a second field coil part connected between the other end of the rectifier element and the other end of the capacitor, and
   the first field coil part is disposed on a side closer to a main magnetic pole of the rotor core than to the second field coil part.

7. A field winding type rotary machine, comprising:
   a stator having a stator core and a stator coil wound on the stator core;
   a rotor having a rotor core and a rotor field coil wound on the rotor core;
   a rectifier element connected between both ends of the rotor field coil; and
   a capacitor having one end connected to one end of the rectifier element and another end connected to any point of the rotor field coil, wherein
   the rotor field coil has a first field coil part connected to the capacitor in parallel and a second field coil part connected between the other end of the rectifier element and the other end of the capacitor, and
   the first field coil part is disposed on a side farther from the stator core than from the second field coil part.

8. A field winding type rotary machine, comprising:
a stator having a stator core and a stator coil wound on the stator core;
a rotor having a rotor core and a rotor field coil wound on the rotor core;
a rectifier element connected between both ends of the rotor field coil; and
a capacitor having one end connected to one end of the rectifier element and another end connected to any point of the rotor field coil, wherein
the rotor field coil has a first field coil part connected to the capacitor in parallel and a second field coil part connected between the other end of the rectifier element and the other end of the capacitor, and
the first field coil part is disposed on a side farther from a main magnetic pole of the rotor core than from the second field coil part.

9. A field winding type rotary machine, comprising:
a stator having a stator core and a stator coil wound on the stator core;
a rotor having a rotor core and a rotor field coil wound on the rotor core;
a rectifier element connected between both ends of the rotor field coil; and
a capacitor having one end connected to one end of the rectifier element and another end connected to any point of the rotor field coil, wherein
the rotor field coil has a first field coil part connected to the capacitor in parallel and a second field coil part connected between the other end of the rectifier element and the other end of the capacitor, and
the first field coil part is disposed on a side closer to the stator core than to the second field coil part.

* * * * *